(12) United States Patent
Du et al.

(10) Patent No.: US 7,907,582 B2
(45) Date of Patent: Mar. 15, 2011

(54) METHOD AND APPARATUS FOR ACCESS POINT SELECTION IN WIRELESS LAN

(75) Inventors: Lei Du, Beijing (CN); Yong Bai, Beijing (CN); Lan Chen, Beijing (CN); Fujio Watanabe, Union City, CA (US); Akira Yamada, Kanagawa (JP)

(73) Assignee: NTT DOCOMO, Inc., Tokyo (JP)

( * ) Notice: Subject to any disclaimer, the term of this patent is extended or adjusted under 35 U.S.C. 154(b) by 704 days.

(21) Appl. No.: 11/869,581

(22) Filed: Oct. 9, 2007

(65) Prior Publication Data
US 2008/0102852 A1     May 1, 2008

Related U.S. Application Data

(60) Provisional application No. 60/862,873, filed on Oct. 25, 2006.

(51) Int. Cl.
H04W 4/00 (2009.01)
(52) U.S. Cl. .................. 370/338; 370/252; 455/436
(58) Field of Classification Search .......... 370/338, 370/331–334, 252, 253; 455/436–446, 453, 455/454; 709/229
See application file for complete search history.

(56) References Cited

U.S. PATENT DOCUMENTS

| | | | |
|---|---|---|---|
| 6,522,881 B1 | 2/2003 | Feder et al. | |
| 7,573,857 B1 * | 8/2009 | Radhakrishnan et al. | 370/338 |
| 7,643,451 B2 * | 1/2010 | He et al. | 370/331 |
| 2004/0001467 A1 * | 1/2004 | Cromer et al. | 370/338 |
| 2004/0202141 A1 | 10/2004 | Sinivaara et al. | |
| 2006/0262932 A1 * | 11/2006 | Sood et al. | 380/272 |
| 2007/0091851 A1 * | 4/2007 | Simonsson et al. | 370/332 |
| 2007/0217377 A1 * | 9/2007 | Takeuchi | 370/338 |

FOREIGN PATENT DOCUMENTS
CN   20061011074.0   8/2006

OTHER PUBLICATIONS

ANSI/IEEE Std. 802.11, "Wireless LAN Media Access Control (MAC) and Physical Layer (PHY) Specifications," 1999 Edition, Reaffirmed Jun. 12, 2003, pp. 1-513.
IEEE Computer Society, "Part 11: Wireless LAN Medium Access Control (MAC) and physical Layer (PHY) specifications: Medium Access Control (MAC) enhancements for Quality of Service (QoS)", IEEE Std. 802.11e/D1.4, Oct. 2001, pp. 1-86.
Hyun-woo Lee, Se-han Kim and Won Ryu, "Performance of an efficient method for association admission control in public wireless LAN", IEEE 2004, pp. 5049-5053.

(Continued)

*Primary Examiner* — Ricky Ngo
*Assistant Examiner* — Gary Mui
(74) *Attorney, Agent, or Firm* — Haynes and Boone, LLP (57) ABSTRACT

A method and an apparatus select an access point (AP) in a wireless LAN to associate or reassociate, based on considerations that take into account the quality-of-service (QoS) status of the stations (STAs) and the potential hidden terminal effect. The method utilizes advertised or requested information obtained from an AP which includes the QoS status in each basic service set (BSS) and estimates the potential hidden terminal (HT) effect based on local channel sensing by the STA. The method selects the AP in a manner that reduces the possibility of collision from equal and higher priority HTs, thus providing greater transmission throughput and improving performance.

34 Claims, 10 Drawing Sheets

OTHER PUBLICATIONS

S. Misra and A. Banerjee. "A Novel Load Sensitive Algorithm for AP selection in 4G Networks". CODEC 2003, Calcutta, India, 2003, 3 pages.

S. Vasudevan, K. Papagiannaki, C. Diot, J. Kurose, and D. Towsley., "*Facilitating access point selection in IEEE 802.11 wireless networks,*" in *ACM Internet Measurement Conf.*, New Orleans, LA, Oct. 2005, pp. 293-298.

T. Korakis, et.al, "Link Quality based Association Mechanism in IEEE 802.11h compliant. Wireless LANs," in Workshop on Resource Allocation in Wireless. Networks (RAWNET), Apr. 2005, 6 pages.

IEEE P802.11v/D0.05, Sep. 2006, "Part 11: Wireless Medium Access Control (MAC) and physical layer (PHY) Specifications," pp. 1-152.

* cited by examiner

Overview of AP selection in overlapping BSSs in WLAN

FIG. 1

| Element ID | Length | Station Count | Channel Utilization | Available Admission Capacity |
|---|---|---|---|---|
| 1 | 1 | 2 | 1 | 2 |

Octets:

QBSS Load Element Format in IEEE 802.11e

FIG. 2

*(Prior Art)*

| Station Count Bitmask | Station Count List |

3-1 QBSS Station Count Sub-element Data field format

| Channel Utilization Bitmask | Channel Utilization List |

3-2 BSS Channel Utilization Sub-element Data field format

| Bit (s) | Description |
|---|---|
| 0 | $AC_1$ VO |
| 1 | $AC_2$ VI |
| 2 | $AC_3$ BE |
| 3 | $AC_4$ BK |

3-3 Exampled Station Count/Channel Utilization Bitmask Definition

Proposed QBSS Sub-element format

FIG. 3a

| Element ID | Length | Station Count Bitmask | Station Count List |

3-1 QBSS Station Count element Data field format

| Element ID | Length | Channel Utilization Bitmask | Channel Utilization List |

3-2 BSS Channel Utilization element Data field format

Proposed QBSS element format

FIG. 3b

4-1 QBSS Station Count Sub-element Data field format 4-2 QBSS Channel Utilization Sub-element Data field format Proposed QBSS Sub-element format without increased overhead for beacon frame

FIG. 4

Components and interfaces of the system at STAs

Flowchart of another proposed AP selection scheme for STAs

FIG. 6  AP selection using passive scanning

FIG. 7  AP selection using Active scanning

FIG. 8a

General Beacon/Probe Response frame format supporting the proposed method

FIG. 8b

Beacon frame format without overhead supporting the proposed method

FIG. 9

AP selection using Action frames

FIG. 10

Roaming Request frame format supporting the proposed method

METHOD AND APPARATUS FOR ACCESS POINT SELECTION IN WIRELESS LAN

CROSS REFERENCE TO RELATED APPLICATIONS

The present patent application is related to and claims priority of U.S. Provisional Patent Application ("Provisional Application"), entitled "Method and Apparatuses for Access Point Selection in Wireless LAN," by D. Lei et al., Ser. No. 60/862,873, filed on Oct. 25, 2006. The Provisional patent application is hereby incorporated by reference in its entirety.

BACKGROUND OF THE INVENTION

1. Field of the Invention

The present invention is related to mobile computing. In particular, the present invention is related to methods for providing an efficient infrastructure for mobile computing.

2. Discussion of the Related Art

A typical prior art wireless local area network (WLAN) is configured to provide a number of access points (APs) interconnected by and to an ethernet backbone. Each AP provides network access over a service area that is referred to as a "basic service set" (ESS) in the IEEE standard IEEE 802.11[1]. The service areas of the APs in a typical WLAN are preferably overlapping to allow a seamless coverage and to provide capacity enhancement where the APs overlap. In a WLAN, a mobile user or station (STA) scans frequently for candidate channels to identify APs for association. Since the media access control (MAC) throughput performance under the IEEE 802.11 depends significantly on the BSS load (e.g. the number of associated stations), a strategy for selecting an AP in an effective manner is important.

[1] IEEE Std. 802.11, "Wireless LAN Media Access Control (MAC) and Physical Layer (PHY) Specifications," 1999.

In the meantime, as the use of multimedia services (e.g., voice, video, and web browsing) in a heterogeneous environment continues to proliferate, WLANs need to provide higher transmission rates and at lower costs. As each type of service has a different specific quality-of-service (QoS) requirement, WLAN standards now provide service differentiation by assigning services to different access categories and according to user priorities (see, e.g., service categories under the IEEE standard IEEE 802.11e[2]). Because different services may co-exist in a WLAN, an effective AP selection method should take into consideration the service type and access priority.

[2] IEEE Computer Society, "Part 11: Wireless LAN Medium Access Control (MAC) and physical Layer (PHY) specifications: Medium Access Control (MAC) enhancements for Quality of Service (QoS)", IEEE Std. 802.11e/D1.4, 2001

Various studies have been made to improve AP selection. The most common and simplest approach is based on received signal strength (RSS) measurements. An STA, upon entering the service area of a WLAN or upon detecting degradation in its existing link, scans each candidate channel and estimates the RSS of the received frames from the available APs. The goal of selecting the AP with the strongest RSS is to access a higher quality channel and at a higher data rate. This method results in a larger admission capacity in a WLAN. While an RSS-based selection method appears to provide a maximum data transmission rate to each STA, such a method ignores the contention-based nature in WLAN access. When STAs gather around one AP, an RSS-based method tends to cause traffic aggregation in some BSSs and severe frame collisions, thereby resulting in throughput degradation.

AP selection methods have also been studied as a possible efficient way to achieve load balancing among different BSSs. For example, in the article "Performance of an efficient method for association admission control in public wireless LAN," by Hyun-woo Lee, Se-han Kim and Won Ryu, and published in the Vehicular Technology Conference (VTC), Fall, 2004, the authors suggest taking BSS load levels of the stations, and their traffic, into account in an AP selection method. Under that method, an AP inserts into one or more reserved fields of beacon or probe response frames values representing their BSS load or traffic, so as to allow the STA to select an AP with a light load and to avoid traffic congestion. Similarly, in the article "A Novel Load Sensitive Algorithm for AP selection in 4G Networks" by S. Misra and A. Banerjee, published in the International Conference of Computer and Devices for Communication (CODEC), Calcutta, India, 2003, the authors propose an association algorithm which further considers an STA's movement, in addition to the load level. The STA's direction of movement allows an AP with a light load along that direction to be selected. While these load-balancing methods may alleviate traffic imbalance between adjacent BSSs to some extent, neither the number of STAs nor the amount of traffic is an accurate measure of the load level.

The Chinese patent application "Method and Apparatus to select AP in WLAN," serial no., 200610110741.0, filed on Aug. 8, 2007, discloses a method for AP selection which enhances total performance by taking into account hidden terminals that may cause much severe throughput degradation. Under that method, the STA avoids collisions with hidden terminals by anticipating their effects in their respective BSSs.

Other proposals present more precise load estimates to allow AP selection. For example, the article "Facilitating access point selection in IEEE 802.11 wireless networks," by S. Vasudevan, K. Papagiannaki, C. Diot, J. Kurose, and D. Towsley, published in ACM Internet Measurement Conf., New Orleans, La., October 2005, describes a method for an STA to estimate a potential bandwidth based on delays experienced by beacon frames received from an AP. In this method, the same access priority is assumed between beacon and other data frames, so that a channel status may be predicted from an offset between the timestamp of a beacon and the target beacon transmission time (TBTT). However, using beacon delay for bandwidth estimation assumes that the beacon frames experience the same contention as other frames. In a WLAN, where the beacon frames are typically sent prior to data frames, such an assumption is typically not valid.

In addition, the article "Link Quality based Association Mechanism in IEEE 802.11h compliant Wireless LANs," by T. Korakis et al, presented in the Workshop on Resource Allocation in Wireless Networks (RAWNET), April 2005, proposes considering the physical layer channel condition (e.g., bi-directional link rate or other channel quality metrics on the uplink and downlink) in selecting the AP to associate. However, these quality metrics (e.g., the bidirectional link rates) are available only for point coordination function (PCF) operation. Since PCF is not enabled in most WLAN products, the Korakis method has limited applications.

SUMMARY OF THE INVENTION

According to one embodiment of the present invention, a method for selecting an AP in a WLAN having overlapping basic service sets (BSSs) improves both the total WLAN throughput and load balancing among adjacent BSSs. The method uses AP selection to provide service differentiation and to further enhance the performance of high priority services. In a BSS which includes multiple types of services, different access rules govern different access categories. For example, a "best effort" service may experience a longer delay before being allowed to access the channel than the delay experienced by a voice service, since the voice service is more sensitive to the delay characteristics. Therefore, when an STA that requires voice service selects an AP to access a WLAN, among APs with the same loads in their BSSs, the STA selects the AP having the least number of STAs that use services of equal or higher priority than the voice service. In this manner, because the STA using the higher priority service preempts access opportunities of those STAs using lower priority services, the performance and throughput of the higher priority service is improved.

According to another embodiment of the present invention, a method selects an AP according to current service type and distribution in BSSs. In this method, APs notify STAs of its load status, expressed in either channel utilization or STA count, for each kind of service the AP supports. A STA, upon receiving the information, scans the channel to estimate the potential hidden terminal effect arising from the STAs with an equal or higher access priority than itself. By selecting the AP with the smallest potential hidden terminal effect, the STA is least likely to be preempted an opportunity to transmit by other STAs that use high priority services, while mitigating frame collisions with the hidden terminals.

BRIEF DESCRIPTION OF THE DRAWINGS

FIG. 5 (a) is an operation flow chart of an AP selection method, according to one embodiment of the present invention.

FIG. 5 (b) is an operation flow chart of an AP selection method, according to another embodiment of the present invention.

DETAILED DESCRIPTION OF PREFERRED EMBODIMENTS

The present invention provides a QoS-aware AP selection method in a WLAN. In one embodiment, the STA selects an AP which provides the least hidden terminal effect from other STAs having equal or higher priorities relative to the STA's own access category (AC).

Figure 1:
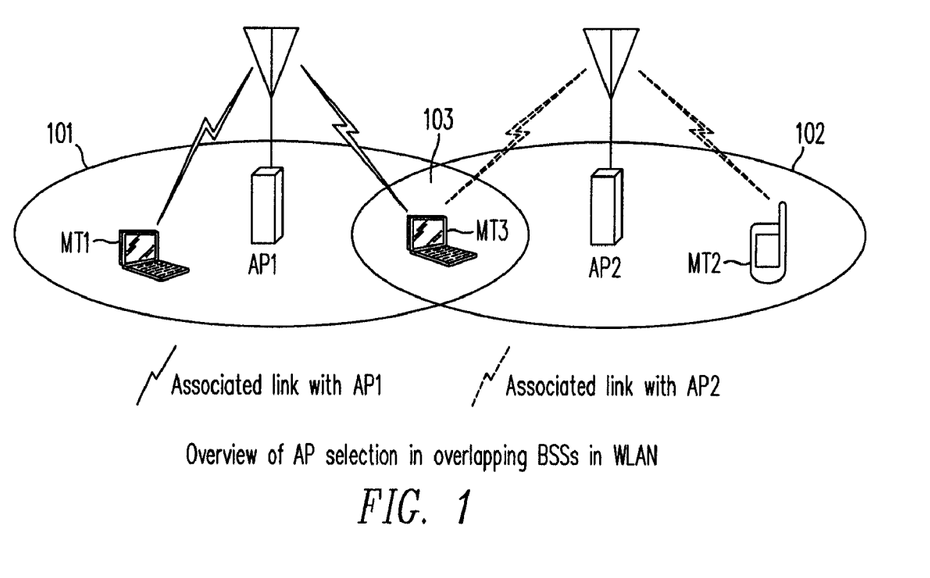
FIG. 1 illustrates a WLAN to which a method of AP selection according to the present invention is applicable.

FIG. 1 illustrates a WLAN 100 to which a method of AP selection according to the present invention is applicable. As shown in FIG. 1, WLAN 100 includes at least access points, AP1 and AP2, which provide service on different channels without co-channel interference. Coverage areas for access points AP1 and AP2 are overlapping, as indicated by coverage areas 101 and 102 (in solid lines). Mobile terminals MT1, MT2 and MT3, each using different qualities of services, access WLAN 100. For example, mobile terminal MT1 uses a voice-over-IP (VoIP) service, and is shown associated with access point AP1. Mobile terminal MT2, for example, uses a "best effort (BE) service and is shown associated with access point AP2. Mobile terminal MT3, for example, may be another VoIP user entering overlapping area 103 between coverage areas 101 and 102. In overlapping area 103, mobile terminal MT3 detects signals from both access points AP1 and AP2. Mobile terminal MT3 may therefore select one of the two access points AP1 and AP2 to associate, according to one embodiment of the present invention.

Figure 2:
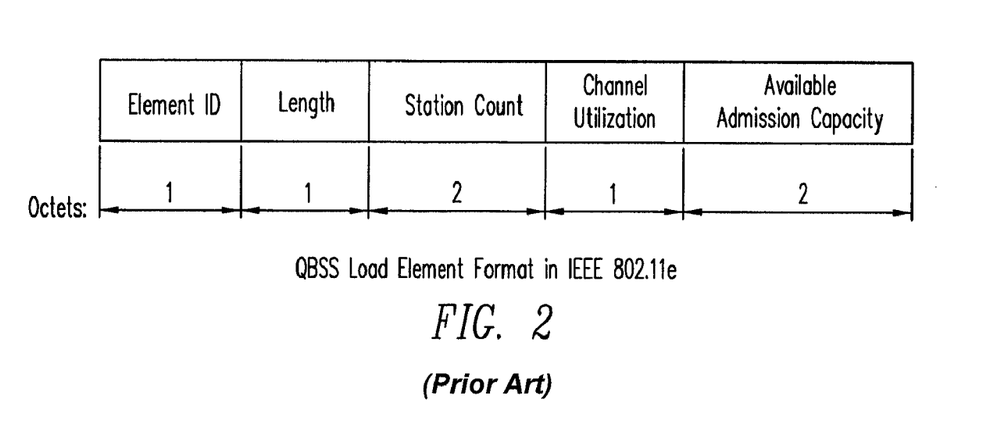
FIG. 2 shows a Quality-of-service Basic Service Set (QBSS) load element in a beacon, response frame or a management/Action frame, as specified under the IEEE standard, IEEE 802.11e.

FIG. 2 shows a Quality-of-service Basic Service Set (QBSS) load element in a beacon or response frame, as specified under the IEEE standard, IEEE 802.11e. As shown in FIG. 2, (i) a "station count" field indicates the number of stations currently associated with this QBSS, (ii) a "channel utilization" field indicates the percentage of time, normalized to 255, a QOS AP (QAP) senses the medium to be busy, as measured by either a physical or a virtual carrier sense mechanism.

Figure 5A:
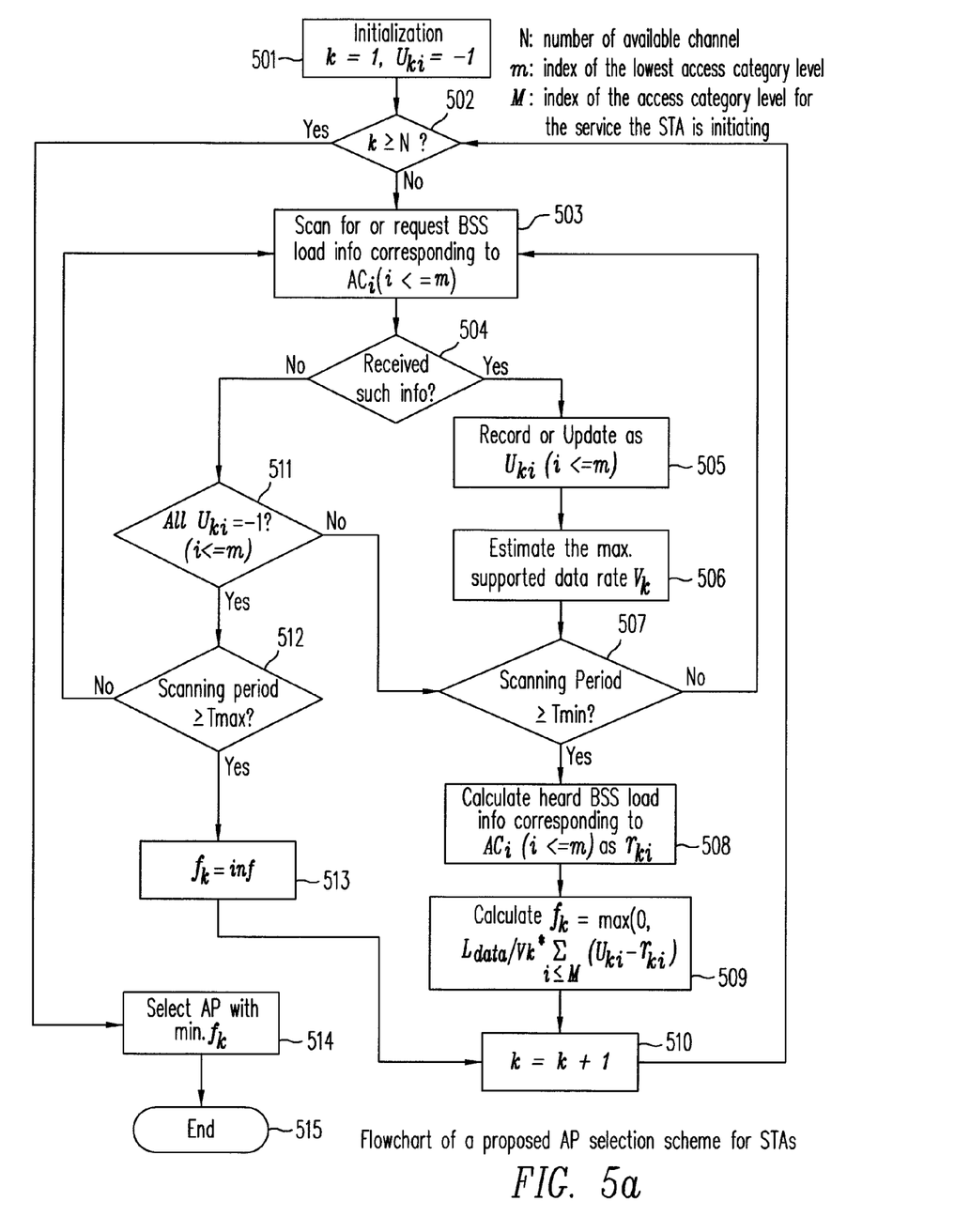

FIG. 5(a) is an operation flow chart 500 of an AP selection method, according to one embodiment of the present invention. As shown in FIG. 5 (a), when a STA enters a WLAN or detects a link degradation in the WLAN, it requests or acquires BSS load information from a candidate AP in each channel (step 503), for ACs equal to or higher than its own AC. In FIG. 5(a), the channels allocated to candidate APs are indexed by index k=1, . . . , N and the ACs are indexed by index i=1, . . . , m. In one embodiment, m=4, corresponding respectively to access categories defined in IEEE 802.11e: voice (VO), video (VI), best effort (BE) and background (BK), indexed in decreasing priority order (i.e., the lower priority services are assigned the larger numbers). The STA's own AC index is denoted by M For example, when M has the value 1, the STA is initiating a VoIP service. The BSS load information for the k-th channel for priority service i is denoted $u_{ki}$, which may be extracted from the value of QBSS station count or channel utilization sub-element corresponding to $AC_i$ in a beacon, a probe-response, or a management/action frame transmitted by the AP in the k-th channel.

Figure 3A:
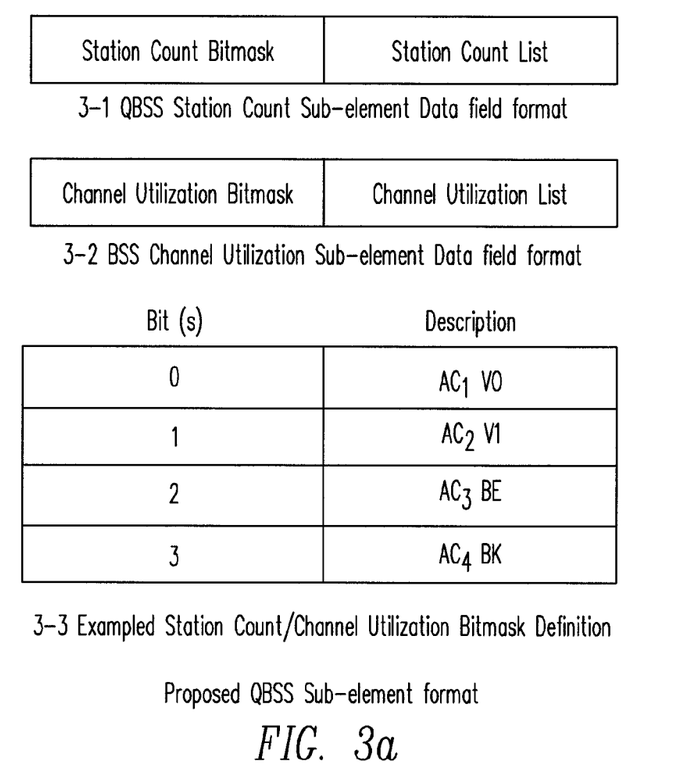
FIG. 3(a) shows proposed quality-of-service BSS (QBSS) load subelements that may be used in a beacon, a probe response or a management/action frame transmitted by an AP, in accordance with one embodiment of the present invention.

Prior to requesting or acquiring the BSS load information, the method initializes the parameters k and $u_{ki}$ (step 501). The default value for $u_{ki}$ is −1, indicating that the BSS load information corresponding to $AC_i$ for channel k has not been obtained. Possible quantities to derive $u_{ki}$ include station count and channel utilization. FIG. 3(a) shows proposed quality-of-service BSS (QBSS) load sub-elements that may be used in a beacon, a probe-response, or a management/action frame transmitted by an AP, in accordance with one embodiment of the present invention. Such QBSS sub-elements may appear in beacon frames, probe response frames or the neighbor report elements included in roaming management frames. Sub-element 3-1 is the format for a QBSS station count sub-element, which includes (a) a station count bitmask field which indicates the ACs for which station counts are provided; and (b) a station count list, which lists the station counts. Each bit in the station count bitmask that is set to '1' corresponds to an AC for which a station count is provided. The encoding for the bitmask for m=4 is shown in 3-3. The station count list provides a sequence of station count corresponding respectively to station counts for ACs indicated by the station count bitmask. The station count may be provided, for example, by the number of stations belonging to each corresponding AC currently associated with the QBSS.

Sub-element 3-2 is a format for a QBSS channel utilization sub-element, which includes (a) a channel utilization bitmask field which indicates the ACs for which channel utilization values are provided; and (b) a channel utilization list, which lists the channel utilization values. Channel utilization may be expressed, for example, by the percentage of time (e.g., normalized to 255) the AP senses the medium busy, as a result of channel utilization by STAs belonging to the corresponding AC. Channel utilization may be measured, for example, by either a physical or a virtual carrier sense mechanism.

Figure 4:
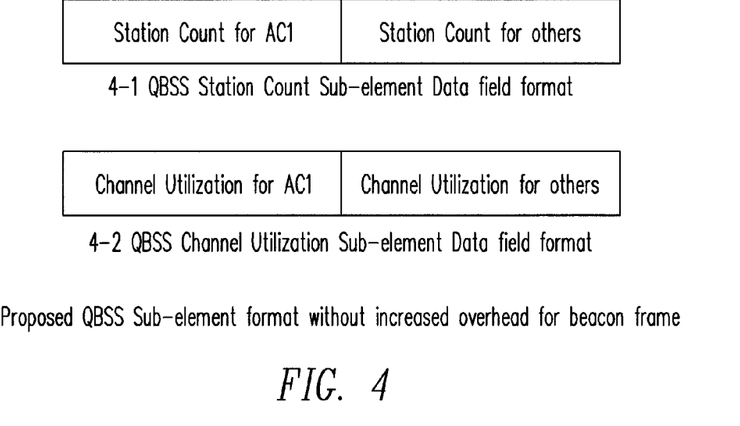
FIG. 4 shows an alternative proposed QBSS load sub-element format that can be provided without lengthening the beacon or management frame, in accordance with one embodiment of the present invention.

FIG. 4 shows an alternative proposed QBSS load sub-element format that can be provided without lengthening the beacon, the probe-response, or the management/action frame, in accordance with one embodiment of the present invention. Such a sub-element is particularly beneficial for a beacon frame, which is desired to have minimal overhead. As shown in FIG. 4, sub-element 4-1 includes a station count field, which consists of: (a) the station count for $AC_1$ (i.e., the number of VoIP STAs currently associated with the QBSS); and (b) the number of STAs other than the STAs of $AC_1$. This format allows a VoIP STA to select an AP using the station count for $AC_1$, while another STA may use instead the total number of STAs in the QBSS (i.e., the sum of the two parts of the station count field). Similarly, sub-element 4-2 illustrates the alternate format for expressing channel utilization as a channel utilization for $AC_1$, and channel utilization by all other STAs associated with the QBSS.

Figure 3B:
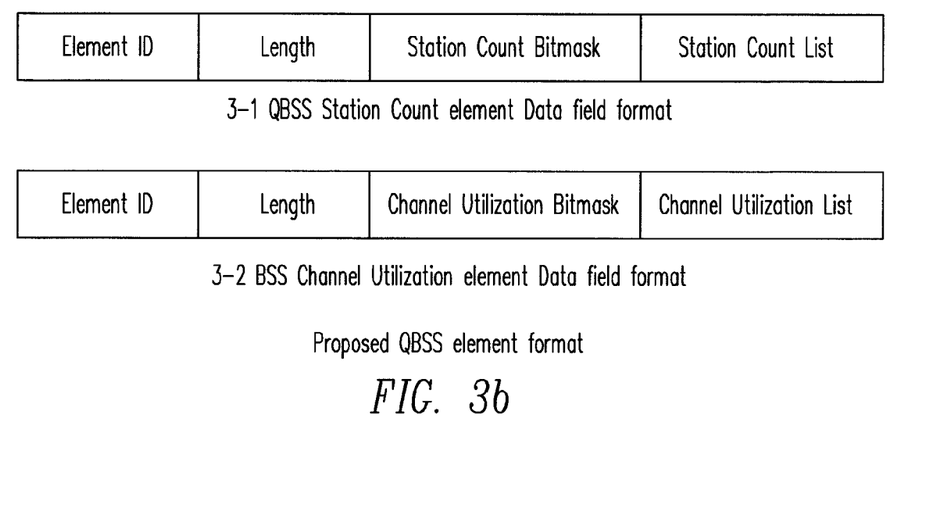
FIG. 3(b) shows proposed load elements that may be used in a beacon, probe response or a management/action frame transmitted by an AP, in accordance with one embodiment of the present invention.

Although in FIGS. 3 and 4 QBSS station count and QBSS channel utilization are each expressed as a "sub-element" of the QBSS load element shown in FIG. 2, QBSS station count and QBSS channel utilization may also be used as an independent information element, such as shown in FIG. 3(b). Returning to FIG. 5(a), in this embodiment, the N channels are processed sequentially. While not all channels have been processed (step 502), the STA scans for or requests BSS load information (step 503) from the k-th channel, specifying its own $AC_i$ or another AC of interest. When the STA successfully obtains the BSS load information (step 504), the STA extracts the channel utilization or station count sub-element or elements according to the $AC_i$ (i≦m) from the received frame. The STA then records or updates the values as $u_{ki}$, as appropriate (505). Meanwhile, based on the RSS measurement of received frames, the STA estimates the maximum supportable data rate $v_k$ in channel k (step 506).

If the STA cannot obtain the BSS load information, the STA determines whether or not such information has previously been recorded for this channel k (i.e., all $u_{ki}$ have the value of −1; step 511). If no information has been recorded for this channel k, the STA determines if sufficient time has elapsed since the beginning of processing in the channel (512). If the elapsed time has reached maximum scanning period, $T_{max}$, STA sets the potential hidden terminal effect $f_k$ for the $k^{th}$ channel to a very large value ("infinity"), indicating that the channel is currently unavailable (513). Otherwise, the STA returns to step 503, to continue checking whether or not the BSS load information is detected in channel k.

After the STA estimates the supportable data rate $v_k$ (step 506), or if the current BSS load information cannot be obtained, but the BSS load information has previously been recorded (i.e., after step 511), the STA determines whether or not the scanning period has exceeded the minimum required scanning period $T_{min}$ (step 507). If so, the STA calculates the heard BSS load information $r_{ki}$ for channel k and for each relevant $AC_i$, i≦m (step 508). $r_{ki}$ refers to the overheard number of STAs corresponding to the relevant $AC_i$, or the relevant channel utilization ratio (i.e. the percentage of time that the STA senses the medium busy due to the STAs corresponding to the relevant $AC_i$, as indicated by either the physical or virtual carrier sense mechanism). The AC type of $r_{ki}$ may be obtained, for example, by extracting the AC values from the QBSS field of overheard frames.

In one embodiment, to obtain the heard BSS load information, the mobile terminal senses the channel overhearing the received frames that are not destined to itself, and extracts the identities and the ACs of the stations transmitting the frames. The heard BSS load may be represented by the number of stations with different identities persisting to each AC that are overheard by the mobile terminal. Alternatively, the mobile terminal extracts the ACs of the stations transmitting the frames and accumulates the channel time occupied by these frames in each AC. The heard BSS load may be represented by these channel times. The parameters $T_{min}$ and $T_{max}$ controls the duration over which the mobile station scans a channel and accumulates the heard BSS load. Based on activities during the duration (i.e., for at least $T_{min}$, but at most $T_{max}$), the mobile station determines the condition of the channel and whether or not the channel is available. The setting of $T_{min}$ may take into account such parameters as the traffic load in the currently scanned channel, and the beacon interval.

After the STA has obtained a set of $(u_{ki}, r_{ki}, v_k)$, i≦m, for all N candidate channels, the STA calculates the potential hidden terminal effect $f_k$ for each channel k, which is given by:

$$f_k = \max\left(0, L_{DATA}/v_k \cdot \sum_{i=1}^{M}(u_{ki} - r_{ki})\right)$$

(step 509), where $L_{DATA}$ is the average data length the STA is going to transmit. The STA then examines all $f_k$'s and selects the AP with the least $f_k$ to associate or reassociate (step 514).

Figure 5B:
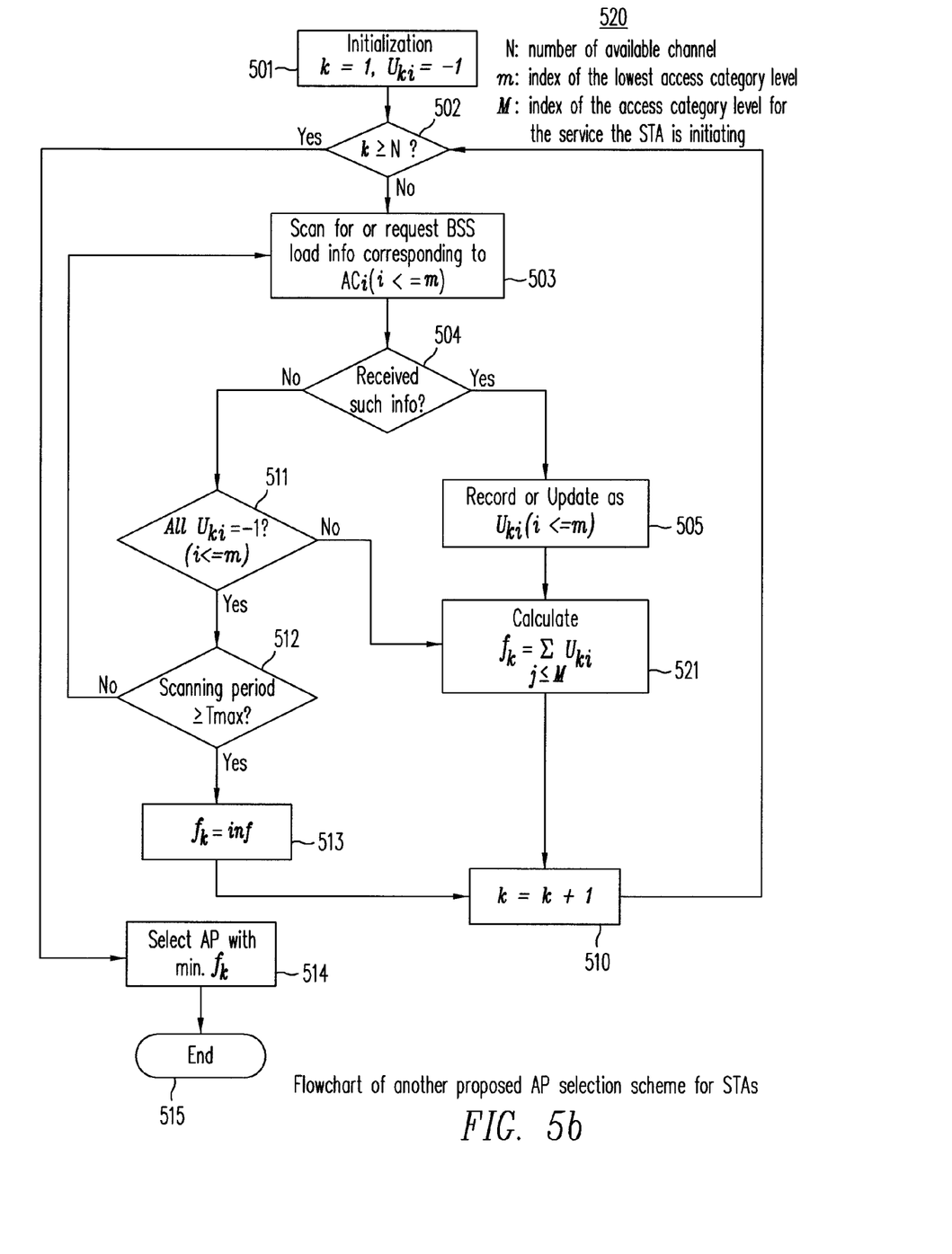

FIG. 5 (b) shows an operation flow chart 520 of an AP selection method, according to another embodiment of the present invention. In contrast with FIG. 5 (a), step 521 replaces steps 506-509. That is, when the STA records or updates the values as $u_{ki}$, as appropriate (step 505), or when the BSS load information has previously been recorded for this channel k (i.e., not all $u_{ki}$ have the value of −1; step 511), the STA calculates the load status that use services of equal or higher priority than the STA's AC, $f_k$, for each channel k, which is given by: (step 521)

$$f_k = \sum_{i=1}^{M} u_{ki}.$$

The STA then examines all $f_k$'s and selects the AP with the least $f_k$ to associate or reassociate (step 514).

Figure 6:
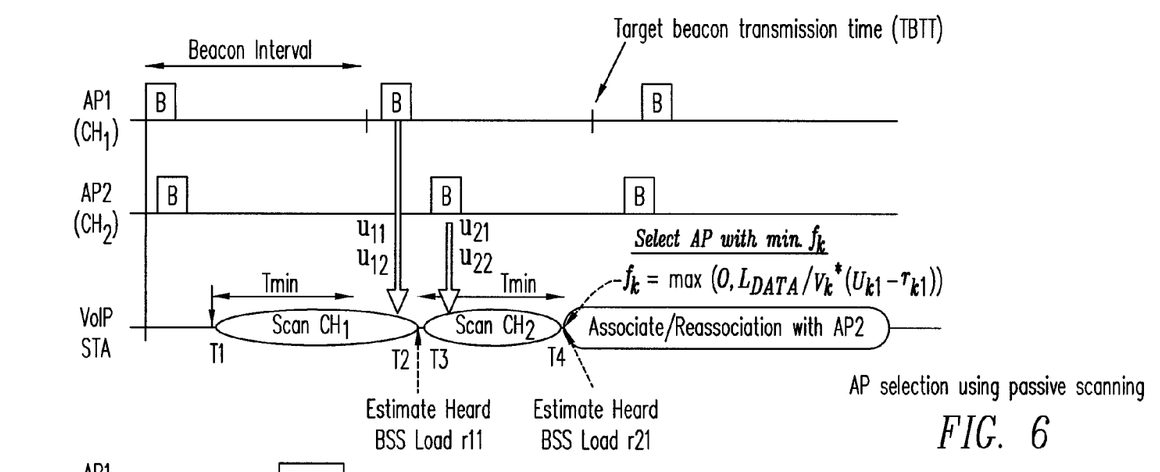
FIG. 6 shows implementation of the method of FIG. 5(a), according to one embodiment of the present invention.
Figure 7:
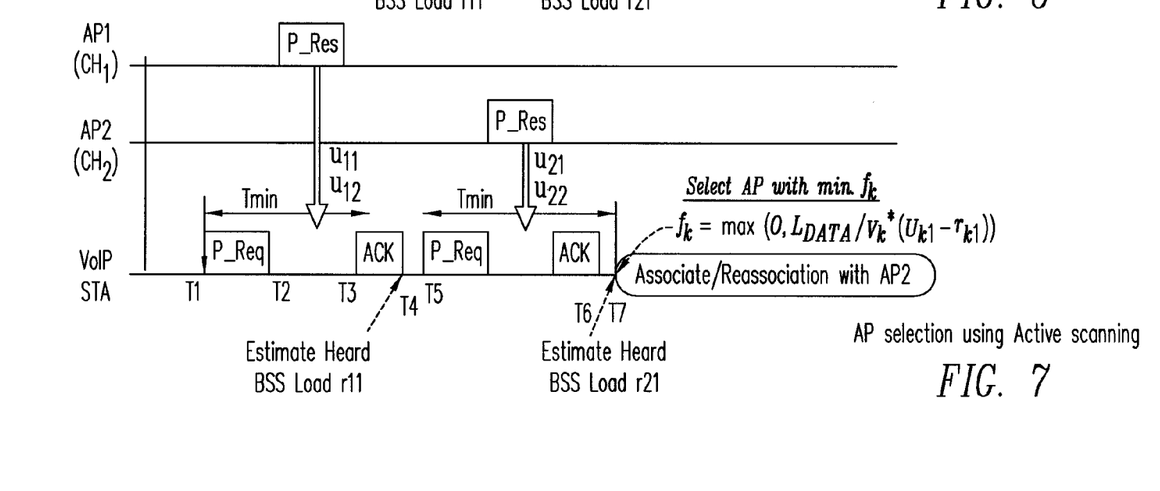
FIG. 7 shows implementation of the method of FIG. 5(b), according to another embodiment of the present invention.
Figure 8A:
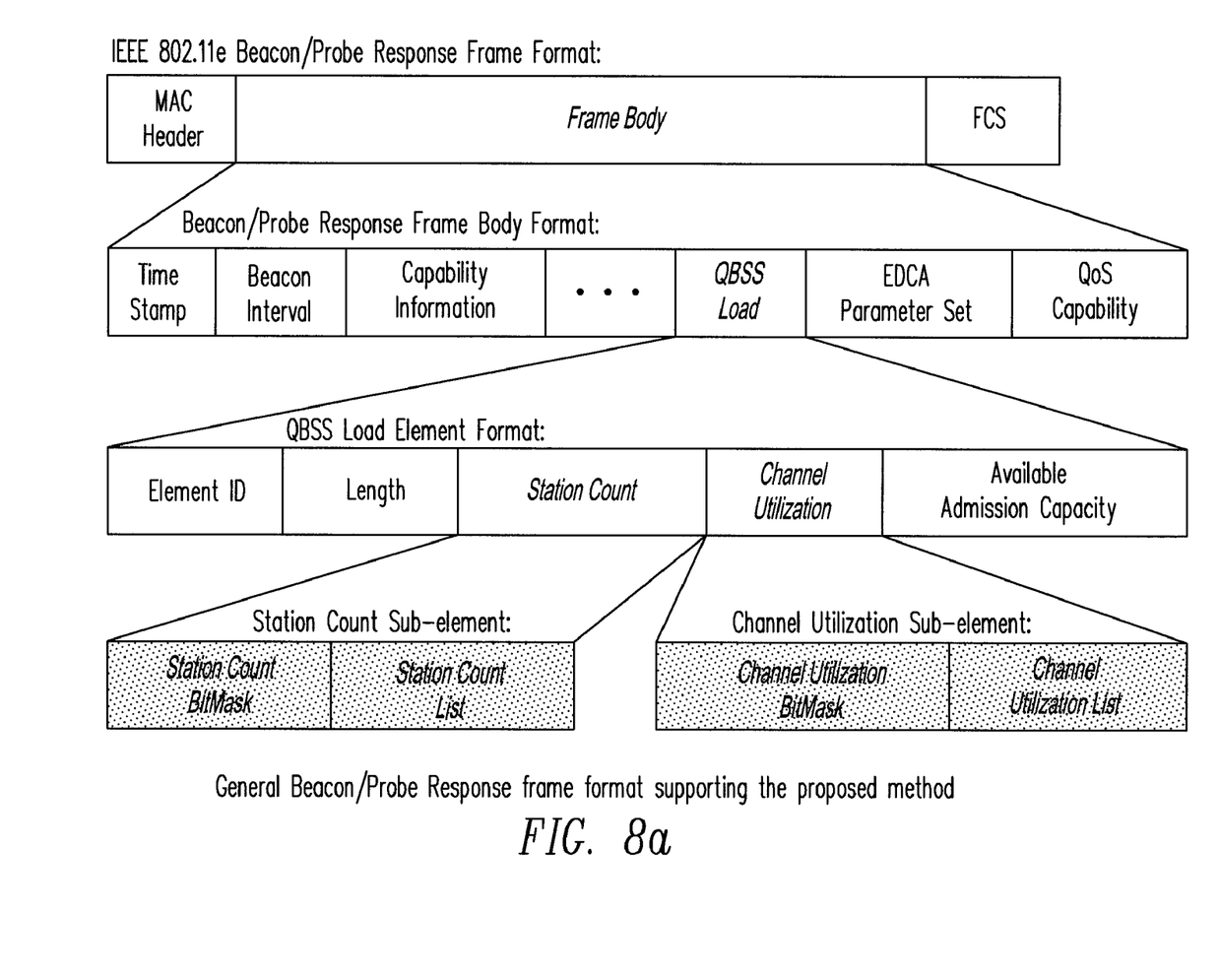
FIG. 8(a) shows a BSS load sub-element proposed to be included in the beacon, probe response or the management/action frame under any embodiment of FIGS. 6, 7 and 9.
Figure 8B:
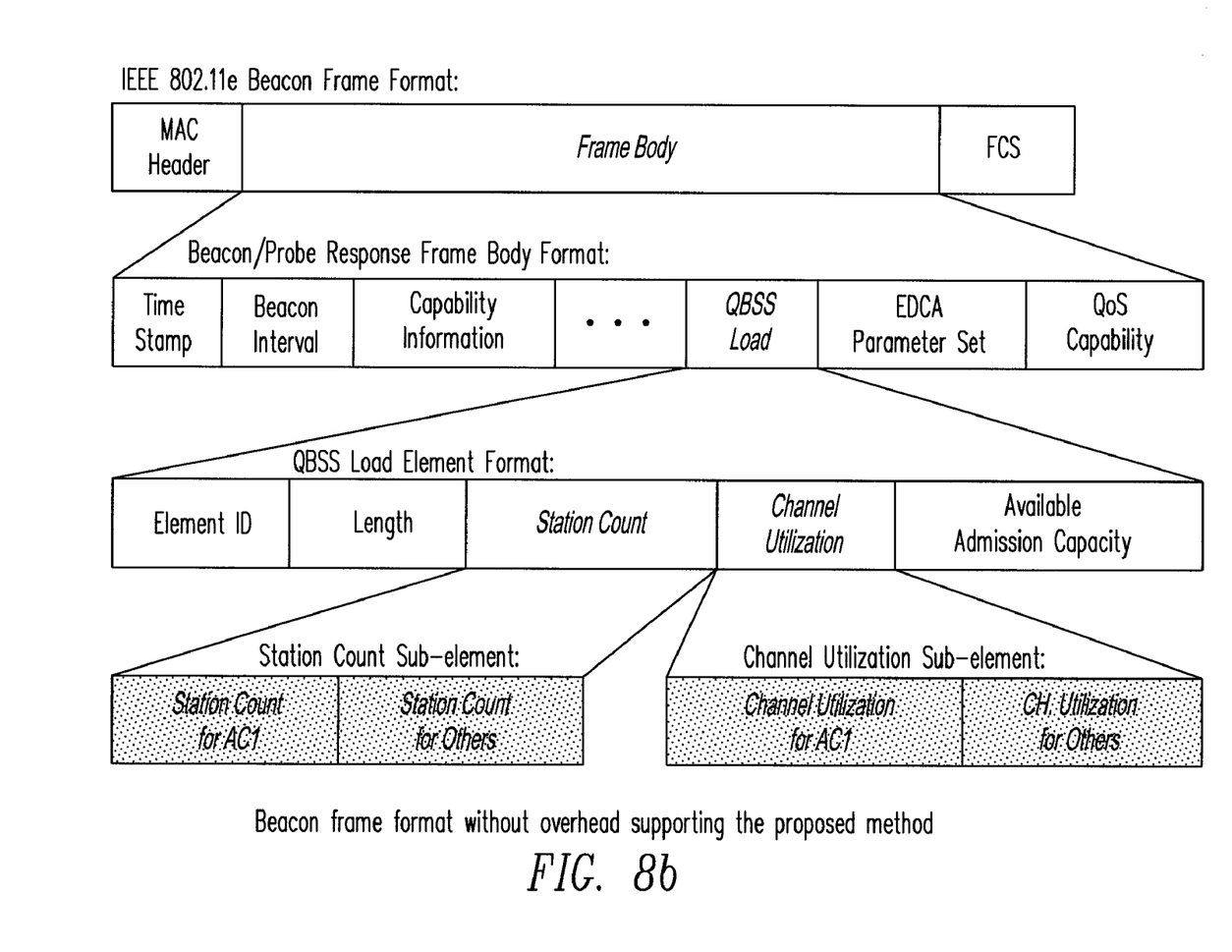
FIG. 8(b) shows another BSS load sub-element proposed to be included in the beacon, probe response or management/action frames under any embodiment of FIGS. 6, 7 and 9.
Figure 9:
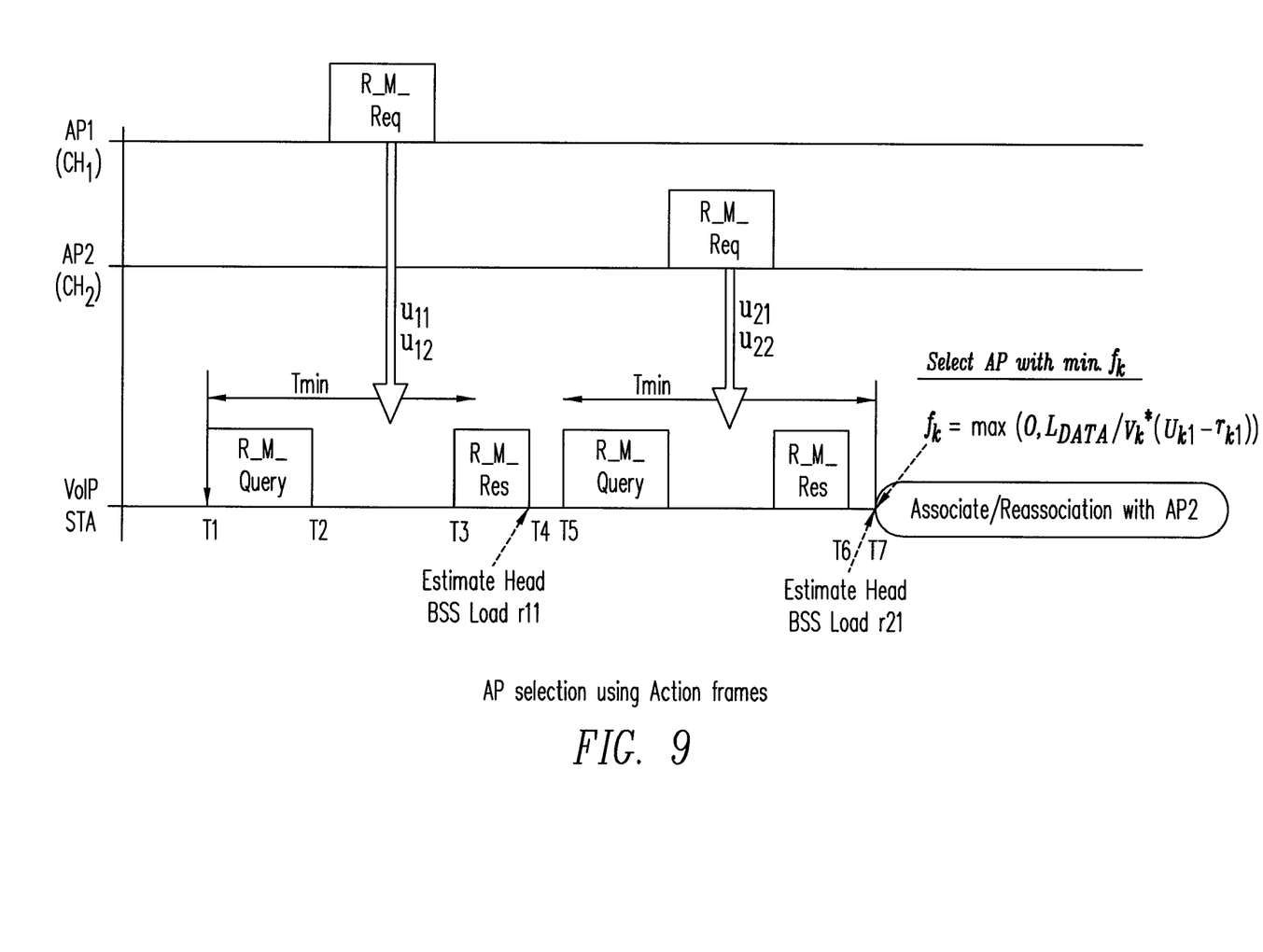
FIG. 9 shows implementation of the method of FIG. 5(a), according to yet another embodiment of the present invention.
Figure 10:
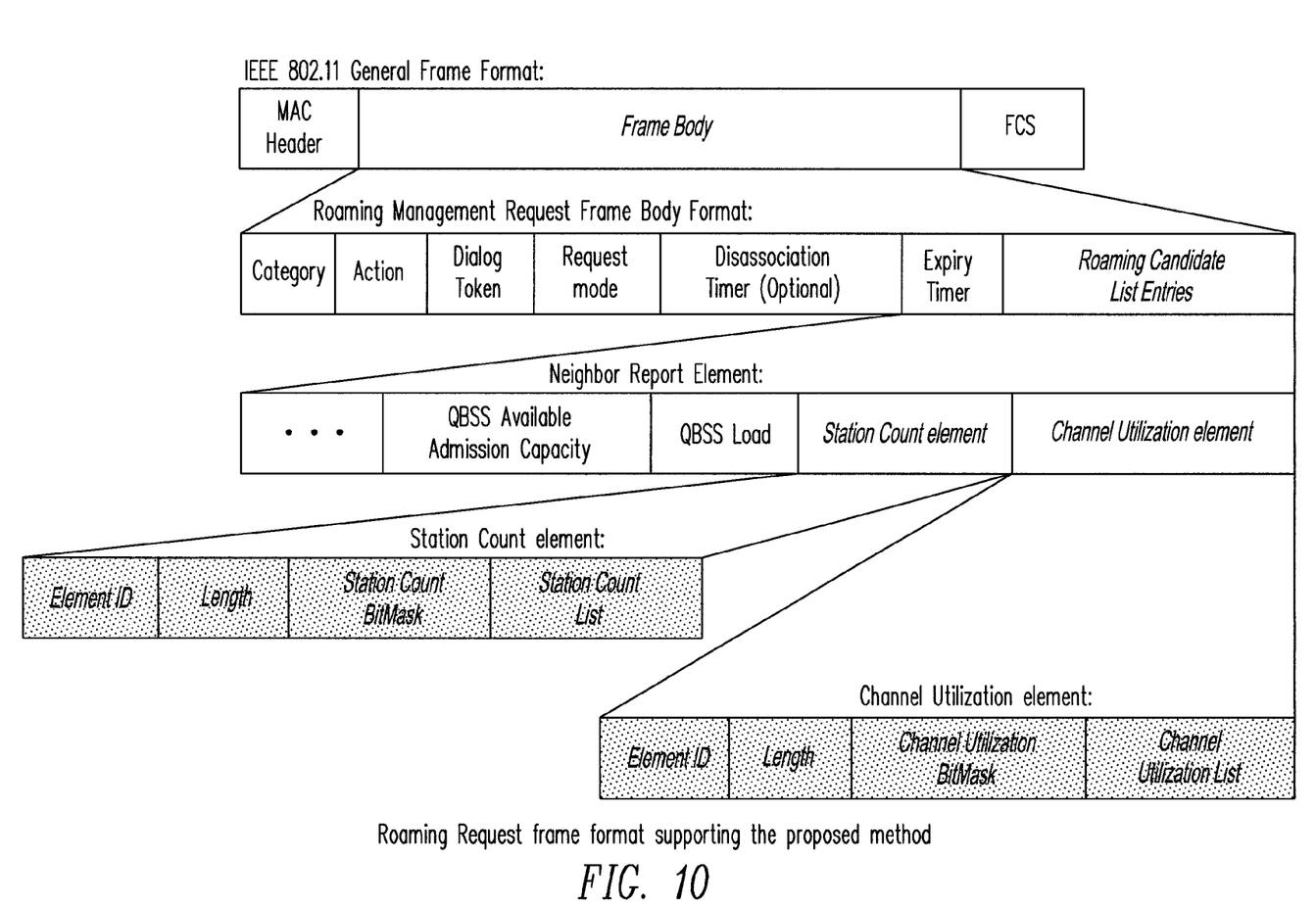
FIG. 10 shows a BSS load element proposed to be included in the beacon, probe response or management/action frames under any embodiment of FIGS. 6, 7 and 9.

FIGS. 6, 7 and 9 illustrate the method of FIG. 5(*a*) in different embodiments. The method of FIG. 5(*b*) is substantially the same as that of FIG. 5(*a*), except that step 506-509 in FIG. 5(*a*) are replaced in FIG. 5(*b*) by step 521 of FIG. 5(*b*). In each of these embodiments, a BSS load sub-element or element is proposed to be included in the beacon, the probe-response, or the management frames. FIG. 8-(*a*) illustrates using the formats of FIG. 3(*a*) in the embodiments of FIGS. 6, 7 and 9. FIG. 8(*b*) illustrates using the formats as FIG. 4 in the embodiments of FIGS. 6, 7 and 9. FIG. 10 illustrates using the formats of FIG. 3(*b*) to the embodiment of FIGS. 6, 7 and 9.

FIG. 6 shows application of the method of FIG. 5(*a*) for a STA operating under a passive scanning mode. The IEEE 802.11 standard defines passive and active scanning modes for an STA to acquire synchronization in a WLAN. As shown in FIG. 6, under the passive mode, access points AP1 and AP2 periodically broadcast beacon frames containing BSS-specific information at a series of target beacon transmission times (TBTTs), which are separated by a fixed beacon interval. Transmission of the beacon frame may be deferred if the channel is sensed busy at a TBTT, until the channel is sensed idle again. For this embodiment, any one of the BSS load sub-elements or elements proposed to be included in the beacon frames shown in FIG. 8(*a*), FIG. 8(*a*) and FIG. 10 may be used.

As shown in FIG. 8(*a*), both the beacon and the probe-response frames may contain a "QBSS load" field, which includes "station count" and "channel utilization" elements, similar to those specified in the IEEE standard, IEEE 802.11e, shown in FIG. 2. In FIG. 8(*a*), however, "station count" values, "channel utilization" values, or both, are given for each AC, with the appropriate format adopted from the formats shown in FIG. 3. Depending on the implementation, it may not be necessary to provide both "station count" and "channel utilization" values by ACs; nor, for overhead reasons, is it necessary to include the station count or channel utilization data for all ACs. For example, only higher priority ACs (e.g., VO and VI) need be included in the beacon or probe response frames. The corresponding bits in the bitmask indicate whether the value for any specified AC is included.

Alternatively, the QBSS load sub-element of FIG. 8(*b*), which does not lengthen the beacon frame (relative to the existing standard) may be used. The QBSS load element of FIG. 8(*b*) takes the format explained above, with respect to FIG. 4. In this manner, the overhead associated with the beacon frame is not increased. This format is preferable under the passive scanning mode. As shown in FIG. 8(*b*), a first part in the previous QBSS load element provides the station count or channel utilization for a specified AC (e.g., AC$_1$, or VoIP), while the other part provides for same statistic for other ACs. Based on this beacon format, VoIP STAs can be differentiated by calculating the potential hidden terminal effect from VoIP STAs in this QBSS.

As shown in FIG. 6, at time T1, a VoIP STA enters the WLAN or detects a link degradation, a method for AP selection is triggered. The STA selects a channel (e.g. CH1) from its list of candidate channels to listen to a beacon frame. At time T2, the STA successfully detects a beacon frame in CH1, and extracts the QBSS load information (i.e., either the station count or channel utilization sub-element). In this example, the beacon provides values only for higher priority ACs (e.g., $u_{11}$ and $u_{12}$, for VO and VI respectively). Meanwhile, the STA measures the signal strength of the received beacon and estimates the maximum supported data rate on this channel as $v_1$.

After receiving the beacon frame at time T2, the STA determines whether or not the elapsed scanning time in CH1 exceeds the minimum scanning time $T_{min}$. As the elapsed scanning time exceeds the minimum scanning time $T_{min}$, a heard BSS load $r_{ki}$ is estimated for CH1. As only the sub-elements corresponding to the ACs equal or higher than the STA's AC are considered, $r_{ki}$ includes only the number of VoIP STAs or the channel utilization due to VoIP transmission. The same procedure is then repeated in candidate channel CH2.

At time T3, the STA successfully detects a beacon frame in channel CH2, and thereby obtains a set of BSS load information U2, and u22 and signal strength-based data rate estimate $v_2$. As time T3 is within the minimum required scanning period $T_{min}$, scanning continues in the channel until $T_{min}$ is reached (i.e., until time T4). At time T4, the heard BSS load $r_{21}$, corresponding to the ACs equal or higher than that of itself, is estimated.

As the STA has by time T4 scanned both candidate channels CH1 and CH2, the STA calculates the potential hidden terminal effect $f_k$ for each channel using the information it has gathered for that channel during channel scanning. Since the STA uses the VoIP service, corresponding to the highest AC, only VoIP STAs are considered in estimating the potential hidden terminals effect (i.e. $f_k = \max(0, L_{DATA}/v_k \cdot (u_{k1} - r_{k1}))$. In this example, $f_2$ is less than $f_1$, access point AP2 is selected. The STA hence associates or reassociates with access point AP2.

FIG. 7 illustrates application of the method of FIG. 5(*a*) to a STA operating under active scanning mode. In active scanning mode, unlike the passive mode, the STA sends out probe messages to the candidate channels. As seen from FIG. 7, a STA begins scanning channel CH1 (one of two candidate channels in its candidate channel list) at time T1 by sending a "probe request" frame (P_Req) which addresses access point AP1 of channel CH1. Access point AP1, upon receiving the P_Req matching its identity at time T2, replies with a probe response frame (P_Res) enclosing BSS load information $u_{11}$ and $u_{12}$, using a frame format shown in any one of FIGS. 8(*a*), 8(*b*) and 10 (described above with respect to the beacon frame of FIG. 6). Meanwhile, the maximum supported data rate $v_k$ is estimated from the measured RSS of the P_Res frame. At time T3, the STA replies with an acknowledgement (ACK) frame to confirm the successful reception of P_Res.

At time T4, the STA determines that the scanning period has exceeded minimum scanning time $T_{min}$, a heard BSS load $r_{11}$ is estimated, corresponding to ACs equal or higher priority than the STA's own AC (i.e., VoIP, in this example). The same procedure is then repeated for channel CH2. In channel CH2, at time T6, as the scanning period does not exceed $T_{min}$, the STA continues the scanning until time T7, when a heard BSS load $r_{21}$ may be estimated, having scanned for the minimum period $T_{min}$. In the same manner as described above for FIG. 6, the hidden terminal effect $f_k$ is estimated for each channel (i.e., $f_k = \max(0, L_{DATA}/v_k \cdot (u_{k1} - r_{k1}))$), taking into consideration only the VoIP service, in this example). The AP with the lesser $f_k$ is selected, according to the method of FIG. 5 (*a*).

FIG. 9 shows implementation of the method of FIG. 5(*a*), in which action frames are used to convey the BSS load sub-elements or elements used in an AP selection, according to yet another embodiment of the present invention. Under this method, the STA and the AP exchange a series of frames enabling the roaming capability: "roaming management query" frame (R_M_Query), "roaming management request" frame (R_M_Req) and "roaming management response" frame (R_M_Res). When a STA in a WLAN using a VoIP service detects a link degradation, the STA reselects an AP so as to maintain its access to the WLAN. The roaming management frames, defined in IEEE standard, IEEE 802.11v, draft[3], may be used for obtaining the BSS load information from an AP. As shown in FIG. 9, at time T1, the STA sends to access point AP1 of channel CH1 a "roaming management query" frame to request information. Access point AP1, upon receiving the STA's R_M_Query, replies at time T2 by a R_M_Req frame. In this R_M_Req frame is included a BSS load element, such as shown in FIG. 10. FIG. 10 shows a roaming management request frame that, other than including the proposed BSS load element, conforms substantially with the format specified in the IEEE 802.11v draft for this action frame, which supports a roaming function. The roaming management request frame includes a "roaming candidate list entries" field, which contains one of more "neighbor report elements." The neighbor report element includes the proposed BSS load sub-element to support an AP selection method according to the present invention.

[3] P802.11v-D0.03

The BSS load element in the neighbor report element may take a format, for example, described in conjunction with FIG. 3 above. Upon receiving the roaming management request frame, the STA extracts, for example, the BSS load information $u_{11}$ and $u_{12}$. At time T3, the STA sends a R_M_Res frame to acknowledge receipt of the R_M_Req frame. The frame sequence is similar to the probe-response-acknowledgement sequence described above with respect to FIG. 7. Steps 506-510 of FIG. 5(a) are followed substantially in the same manner discussed with respect to FIGS. 6-7 above. The same procedure is followed to collect BSS information in channel CH2 from access point AP2. Access point selection based on selecting the access point at which the hidden terminal effect is least is then followed, in substantially the same manner as described above with respect to FIGS. 6-7.

Figure 11:
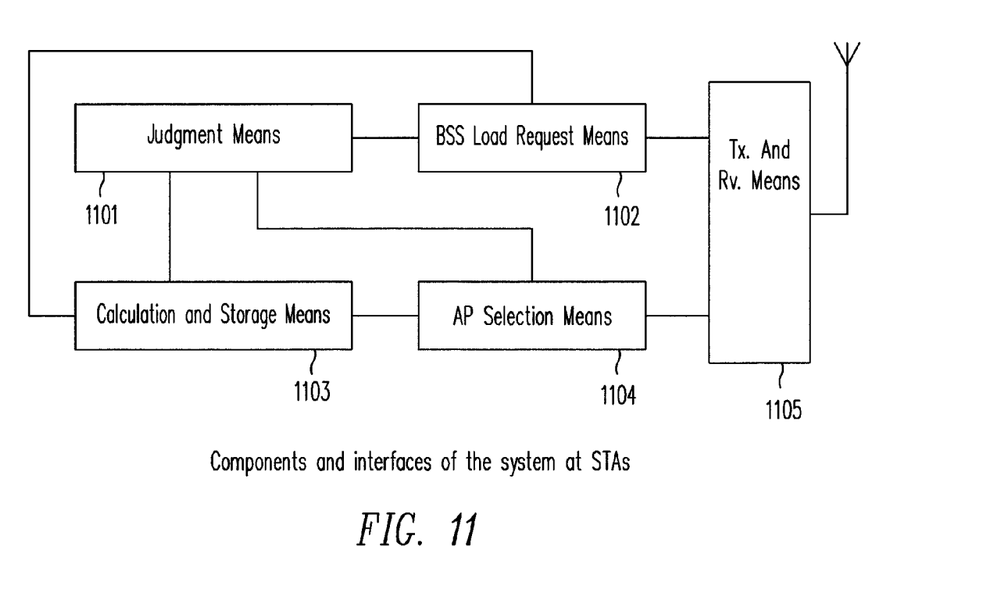
FIG. 11 shows components within an STA to support an AP selection method according to one embodiment of the present invention.

FIG. 11 shows components within STA 1100 provided to support an AP selection method according to one embodiment of the present invention. As shown in FIG. 11, judgment or determination means 1101 comprises primarily a state machine to implement the steps of the method FIG. 5(a) or FIG. 5(b). BSS load request means 1102 perform channel scanning, in any of the passive or active scanning modes, and action frames to obtain the required BSS load sub-elements or elements (See, e.g., the implementations of FIGS. 6, 7, 9), and also to obtain the heard BSS load based on the traffic in each monitored channel. Calculation and storage means 1103 records the required information for AP selection (e.g., $u_{ki}$, $v_k$, $r_{ki}$) and calculates the corresponding $f_k$'s (i.e.

$$f_k = \max\left(0, L_{DATA}/v_k \cdot \sum_{i=1}^{M}(u_{ki} - r_{ki})\right) \text{ or } f_k = \sum_{i=1}^{M} u_{ki}.$$

AP selection means 1104 select an AP based on the $f_k$ for all the candidate i=1 channels, according to methods discussed above. Transmitting and receiving means 1105 transmit and receive frames from the radio interface.

The detailed description above is provided to illustrate the specific embodiments of the present invention and is not intended to be limiting. Numerous variations and modifications within the scope of the present invention are possible. The present invention is set forth in the following claims.

We claim:

1. A method for selecting an access point for a mobile station to associate, comprising:
   in each of a plurality of channels:
   (i) obtaining, from an access point associated with the channel, load information at the access point for each of a plurality of access categories;
   (ii) obtaining from the data packets transmitted by other mobile stations in the channel a measure of channel activity for each access category;
   (iii) calculating a load metric based on the load information and the measure of channel activity; and
   (iv) selecting the access point that is associated with the channel based on the load metrics among the channels.

2. A method as in claim 1, further comprising:
   calculating a hidden terminal effect metric based on a bandwidth requirement of the mobile station, the obtained measure of channel activity, and the load information; and
   wherein selecting the access point further include taking into consideration the calculated hidden terminal effect metric.

3. A method as in claim 1, wherein the load information is derived from beacon frames received at the mobile station operating under a passive scanning mode.

4. A method as in claim 1, wherein the load information is derived from probe-request transactions conducted between the mobile station and the access point according to an active scanning mode.

5. A method as in claim 1, wherein the load information is derived from administrative frames exchanged between the mobile station and the access point according to an administrative function.

6. A method as in claim 1, wherein the load information comprises the numbers of mobile stations associated with the access point by access categories.

7. A method as in claim 1, wherein the load information comprises channel utilization measures by access categories.

8. A method as in claim 1, wherein the load information is provided as a combination of: a bitmask indicating the access categories represented, and a listing of the load information according to access categories.

9. A method as in claim 1, wherein the load information is provided as a combination of (i) load information pertaining to a specified category, and (ii) load information pertaining to access categories other than the specified category.

10. A method as in claim 1, further comprising calculating a data rate based on the measured signal strength received in a transmission from the access point.

11. A method as in claim 1, wherein the method takes into consideration load information pertaining only to access categories that has an equal or higher priority than an access category associated with the mobile terminal.

12. A method as in claim 1, wherein the measure of channel activity is obtained by:
   overhearing in the channel frames that are not addressed to the mobile station;
   extracting from each overheard frame an identity of a sending station and an associated access category; and
   for each access category, accumulating a number of stations based on the identities extracted; and providing the number of stations as the measure of channel activity.

13. A method as in claim 1, wherein the measure of channel activity is obtained by:
  overhearing in the channel frames that are not addressed to the mobile station;
  extracting from each overheard frame an associated access category; and
  for each access category, accumulating time durations of the frames associated with that access category; and providing the accumulated time as the measure of channel activity for the access category.

14. The method of claim 1, wherein each channel is examined for a predetermined duration.

15. An apparatus in a mobile station for selecting an access point in a wireless local area network (WLAN), comprising:
  BSS load request means for obtaining load information according to access categories from a plurality of access points associated with a plurality of channels and for obtaining from overhearing frames transmitted from other mobile stations within each channel load information according to access categories;
  calculation and storage means calculating a load metric based on the load information;
  access point selection means that selects the access point from the calculated load metric; and
  judgment means for controlling the operations of the load request means, the calculation and storage means, and the access point selection means according to an access point selection method.

16. An apparatus as in claim 15, wherein the calculation and storage means further performs
  (i) recording the load information obtained from the access points,
  (ii) recording the heard load information obtained from each channel; and
  (iii) calculating for each channel a hidden terminal effect based on the load information, the heard load information and a bandwidth requirement by the mobile station; and wherein the access point selection means take into consideration the calculated hidden terminal effects.

17. An apparatus as in claim 15, wherein the load information is derived from beacon frames received at the mobile station operating under a passive scanning mode.

18. An apparatus as in claim 15, wherein the load information is derived from probe-request transactions conducted between the mobile station and the access point according to an active scanning mode.

19. An apparatus as in claim 15, wherein the load information is derived from administrative frames exchanged between the mobile station and the access point according to an administrative function.

20. An apparatus as in claim 15, wherein the load information comprises the numbers of mobile stations associated with the access point by access categories.

21. An apparatus as in claim 15, wherein the load information comprises channel utilization measures by access categories.

22. An apparatus as in claim 15, wherein the load information is provided as a combination of: (i) a bitmask indicating the access categories represented, and (ii) a listing of the load information according to access categories.

23. An apparatus as in claim 15, wherein the load information is provided as a combination of (i) load information pertaining to a specified category, and (ii) load information pertaining to access categories other than the specified category.

24. An apparatus as in claim 15, wherein the calculation and storage means provide a data rate based on the measured signal strength received in a transmission from the access point.

25. An apparatus as in claim 15, wherein the calculation and storage means takes into consideration load information pertaining only to access categories that has an equal or higher priority than an access category associated with the mobile terminal.

26. An apparatus as in claim 15, wherein overhearing frames transmitted from other mobile stations within each channel comprises:
  overhearing in the channel frames transmitted by other mobile stations in the channel that are not addressed to the mobile station;
  extracting from each overheard frame an identity of a sending station and an associated access category; and
  for each access category, accumulating a number of stations based on the identities extracted; and providing the number of stations as observed load information for the access category.

27. An apparatus as in claim 15, wherein the heard load information is obtained by:
  overhearing in the channel frames transmitted by other mobile stations in the channel that are not addressed to the mobile station;
  extracting from each overheard frame an associated access category; and
  for each access category, accumulating time durations of the frames associated with that access category; and providing the accumulated time as the observed load information for the access category.

28. The apparatus of claim 15, wherein each channel is examined for a predetermined duration.

29. A system for allowing an efficient access point selection in a wireless computer network, comprising:
  a plurality of access points of the wireless computer network having overlapping coverage areas operating on a plurality channels, each access point being configured to provide load information regarding its channel by access categories; and
  a mobile station configured to (i) receive at the overlapping coverage areas the load information by access categories from the access point; (ii) listen to other mobile stations in each channel to obtain heard load information of each channel by access categories; (iii) calculate a load metric for each channel based on the load information from the access points and the heard load information; and (iv) select one of the access point based on the calculated load metrics.

30. A system as in claim 29, wherein the mobile station is further configured to (i) calculate a hidden terminal effect metric for each channel based on the load information from the access points and the heard load information from the other mobile terminals; and (ii) when selecting one of the access point, take into consideration the calculated hidden terminal effect metrics.

31. A system as in claim 29, wherein the load information is derived from beacon frames received at the mobile station operating under a passive scanning mode.

32. A system as in claim 29, wherein the load information is derived from probe-request transactions conducted between the mobile station and the access point according to an active scanning mode.

33. An system as in claim 29, wherein the load information is derived from roaming management frames exchanged between the mobile station and the access point according to a roaming function.

34. A system as in claim 29, wherein the load information comprises the numbers of mobile stations associated with the access point by access categories.

* * * * *